(12) United States Patent
Kim (10) Patent No.: US 8,623,547 B2
(45) Date of Patent: Jan. 7, 2014

(54) POUCH TYPE LITHIUM SECONDARY BATTERY

(71) Applicant: Samsung SDI Co., Ltd., Yongin-si (KR)

(72) Inventor: Joongheon Kim, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 13/655,253

(22) Filed: Oct. 18, 2012

(65) Prior Publication Data

US 2013/0040192 A1 Feb. 14, 2013

Related U.S. Application Data

(63) Continuation of application No. 12/054,752, filed on Mar. 25, 2008, now Pat. No. 8,313,857.

(30) Foreign Application Priority Data

Jul. 19, 2007 (KR) .............. 10-2007-72187

(51) Int. Cl.
*H01M 2/06* (2006.01)

(52) U.S. Cl.
USPC .......................................... 429/180; 429/181

(58) Field of Classification Search
USPC .......................................... 429/180, 181, 185
See application file for complete search history.

(56) References Cited

U.S. PATENT DOCUMENTS

| 4,278,744 | A | 7/1981 | Athern | |
|---|---|---|---|---|
| 6,797,429 | B1 * | 9/2004 | Komatsu | 429/180 X |
| 6,797,430 | B1 | 9/2004 | Hatta et al. | |
| 6,877,216 | B2 * | 4/2005 | Fukuda et al. | 429/180 X |
| 2002/0157242 | A1 | 10/2002 | Fukuda et al. | |
| 2003/0054241 | A1 | 3/2003 | Yamashita et al. | |
| 2004/0033416 | A1 | 2/2004 | Kim et al. | |

FOREIGN PATENT DOCUMENTS

| CN | 1289459 | 3/2001 |
|---|---|---|
| EP | 0975031 | 1/2000 |
| EP | 1043785 | 10/2000 |
| EP | 1202371 | 5/2005 |
| JP | 2001-297738 | 10/2001 |
| JP | 2002-190283 | 7/2002 |
| JP | 2005-216623 | 8/2005 |
| JP | 2006-073457 | 3/2006 |
| KR | 10-2001-0110686 | 12/2001 |
| KR | 2005-20357 | 3/2005 |
| WO | WO 00/26976 | 5/2000 |
| WO | WO 2007/055479 | 5/2007 |

OTHER PUBLICATIONS

Japanese Office Action dated Sep. 20, 2011 in Application No. 2008-045021.

Examination Report dated Aug. 17, 2010 issued by the EPO in corresponding Korean Patent Application No. 10-2007-0072187.

* cited by examiner

*Primary Examiner* — Stephen J. Kalafut (74) *Attorney, Agent, or Firm* — Knobbe Martens Olson & Bear LLP (57) ABSTRACT

A pouch type lithium secondary battery includes: an electrode assembly including electrode tabs respectively connected to two electrodes, the two electrodes having different polarities; and a case to house the electrode assembly such that the electrode tabs extend to the outside of the case, wherein one stepped part through which the two electrode tabs simultaneously extend is formed in a sealing portion of the case. In the electrode sealing portion of the pouch type lithium secondary battery having short width, sealing of the case is improved by the one stepped part, thereby improving efficiency of the manufacturing process of the battery.

3 Claims, 6 Drawing Sheets

POUCH TYPE LITHIUM SECONDARY BATTERY

CROSS-REFERENCE TO RELATED APPLICATIONS

This application is a continuation of U.S. patent application Ser. No. 12/054,752 titled "POUCH TYPE LITHIUM SECONDARY BATTERY" filed on Mar. 25, 2008, which claims the benefit of Korean Application No. 10-2007-72187 filed on Jul. 19, 2007 in the Korean Intellectual Property Office, the disclosure of which is incorporated herein by reference.

BACKGROUND

1. Field

Aspects of the present invention relate to a pouch type lithium secondary battery, and more particularly, to a pouch type lithium secondary battery that can minimize a size of a cell.

2. Description of the Related Technology

Generally, a lithium secondary battery uses a non-aqueous electrolyte because the lithium actively reacts with water. The electrolyte may be a solid polymer containing lithium salts or a liquid in which the lithium salts are dissociated from an organic solvent.

The lithium secondary battery can be divided according to a kind of electrolyte used, i.e., lithium metal and lithium ion batteries, both of which use a liquid electrolyte, and lithium ion polymer batteries, which use a solid polymer electrolyte. The lithium ion polymer battery can be divided into a complete solid type lithium ion polymer battery containing no organic electrolyte and a lithium ion polymer battery using a gel type polymer electrolyte containing an organic electrolyte.

In the lithium ion polymer battery, a multi-layer film pouch can be used instead of a metal can as used in the lithium metal and lithium ion batteries. The multi-layer film pouch may be formed of a metal foil and at least one polymer film covering the foil. When such multi-layer film pouch is used, the weight of the secondary cell can be greatly reduced compared to the use of a metal can. Aluminum is usually used as the metal forming the foil in the multi-layer film pouch. The polymer film that forms an inner layer of the pouch film protects the metal foil from the electrolyte and prevents an electrical short between electrode tabs.

The pouch type lithium secondary battery may be formed by sealing an electrode assembly, which includes a cathode, a separator, and an anode stacked and/or wound, in a pouch. Then, the sealed pouch type bare cell is manufactured by bonding upper and lower pouch films to open peripheral parts by heating.

In the pouch type bare cell, generally two electrode tabs connected to the electrode assembly extend from the electrode assembly to the outside of the pouch type bare cell. A protection tape is provided to a portion where the two electrode tabs and pouch contact, thereby keeping the two electrode tabs insulated from the pouch during sealing. A stepped part is formed for each electrode tab. The stepped part has a width narrower than that of the protection tape at a sealing portion where the protection tape is provided in the pouch. In the stepped part, a region corresponding to the electrode tab is less pressurized. Thus, a possibility of the electrical short between the metal layer of the pouch and the electrode tabs becomes low and sealing pressure is substantially applied to the peripheral region of the stepped part, thereby improving the safety of the sealing.

As the size of the pouch type lithium secondary battery is greatly minimized, the width of the battery in a longitudinal direction of a withdrawn surface of the electrode tab becomes gradually shorter. In the battery having the short width, a gap between the withdrawn electrode tabs becomes very narrow.

In the battery having a narrow gap between the electrode tabs, it is difficult to exactly set the electrode tab at a position where the stepped part is formed during a sealing process. Accordingly, when the electrode tab is not properly set at the stepped part-forming position, the electrode tab is electrically shorted or defects in sealing occur.

Particularly, in the battery having a short width between the electrode tabs, it is difficult to weld the electrode tabs to an electrode plate and maintain a proper seal around the electrode tab while reducing distribution of gaps between the electrode tabs.

SUMMARY OF CERTAIN INVENTIVE ASPECTS

According to aspects of the present invention, a pouch type lithium secondary battery can improve reliability of a product by stabilizing quality of a sealing portion of a pouch case where electrode tabs are withdrawn.

According to aspects of the present invention, a pouch type lithium secondary battery can improve efficiency of a manufacturing process by improving workability of assembling and sealing process of the battery.

According to an aspect of the present invention, there is provided a pouch type lithium secondary battery, which includes: an electrode assembly including electrode tabs respectively connected to two electrodes, the two electrodes having different polarities; and a case to house the electrode assembly such that the electrode tabs extend to the outside of the case, wherein one stepped part through which the two electrode tabs simultaneously extend is formed in a sealing portion of the case.

According to an aspect of the present invention, the two electrode tabs may be surrounded by an insulating member; the two electrode tabs and the insulating member may be located in an internal region of the stepped part; and outer portions of the insulating member may be formed in the sealing portion of the case outside of the stepped part.

According to an aspect of the present invention, each of the two electrode tabs may be respectively surrounded by an insulating member.

According to an aspect of the present invention, adjacent side edges of each of the insulating members between the two electrode tabs may overlap in the region of the stepped part.

According to an aspect of the present invention, the insulating members may be respectively wound on the two electrode tabs such that adjacent side edges contact; or, the insulating members may be wound on the two electrode tabs with their adjacent side edges being spaced apart; or, the insulating members may be wound on the two electrode tabs with their adjacent side edges being interlocked.

According to an aspect of the present invention, the two electrode tabs may be surrounded by one insulating member.

According to an aspect of the present invention, the insulating member may be a tape.

According to an aspect of the present invention, the two electrode tabs may be fixed in one combining member; the combining member may include tab holes through which the two electrode tabs extend; and the combining member may be made of an insulating material.

According to an aspect of the present invention, the two electrode tabs may be respectively attached to uncoated parts of two electrode plates of the electrode assembly.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF CERTAIN INVENTIVE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
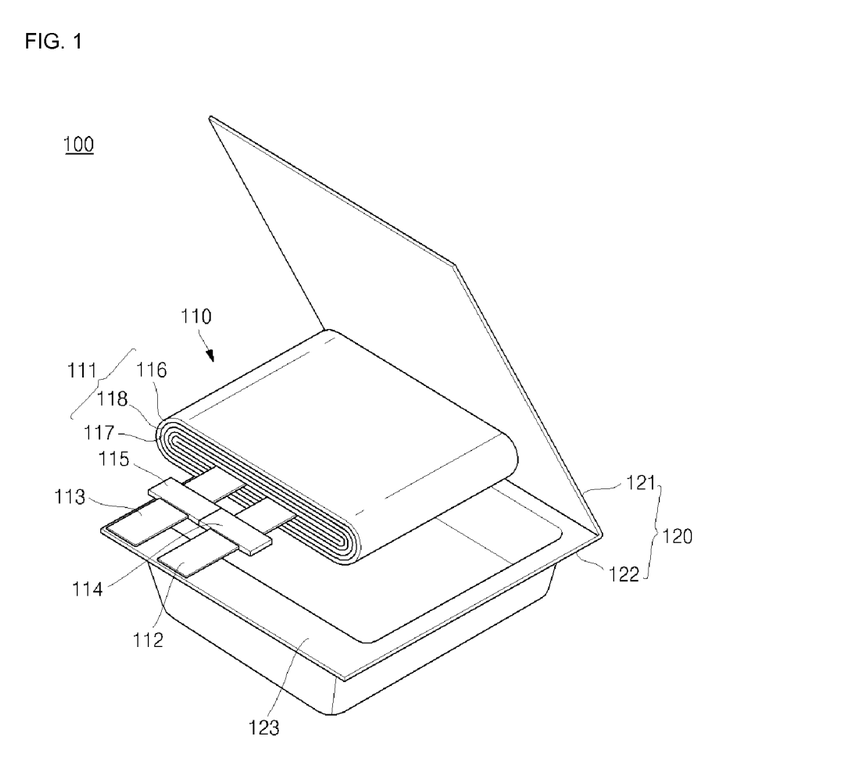
FIG. 1 is an exploded perspective view illustrating a state before a pouch type lithium secondary battery is sealed.
Figure 2:
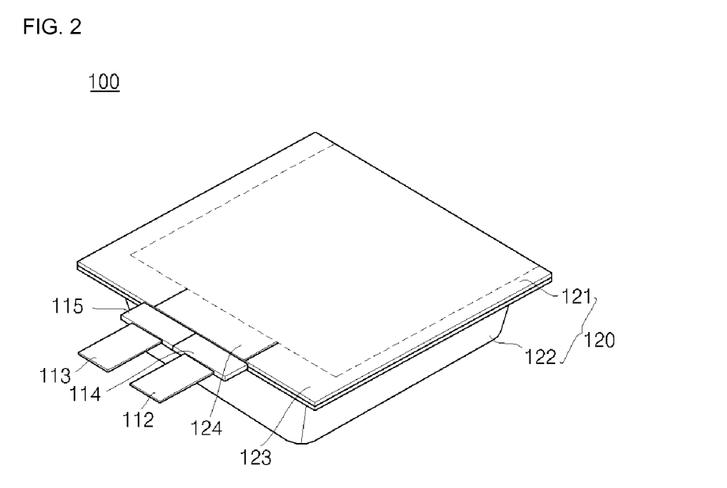
FIG. 2 is a perspective view illustrating a state after a pouch type lithium secondary battery according to an exemplary embodiment of the present invention is sealed.
Figure 3:
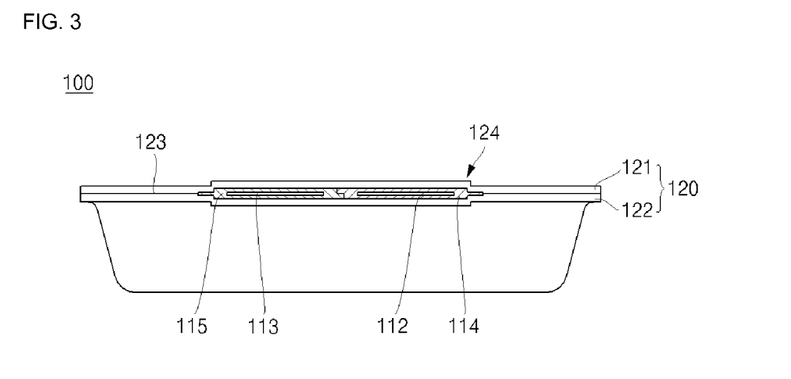
FIG. 3 is a front view of FIG. 2.
Figure 4:
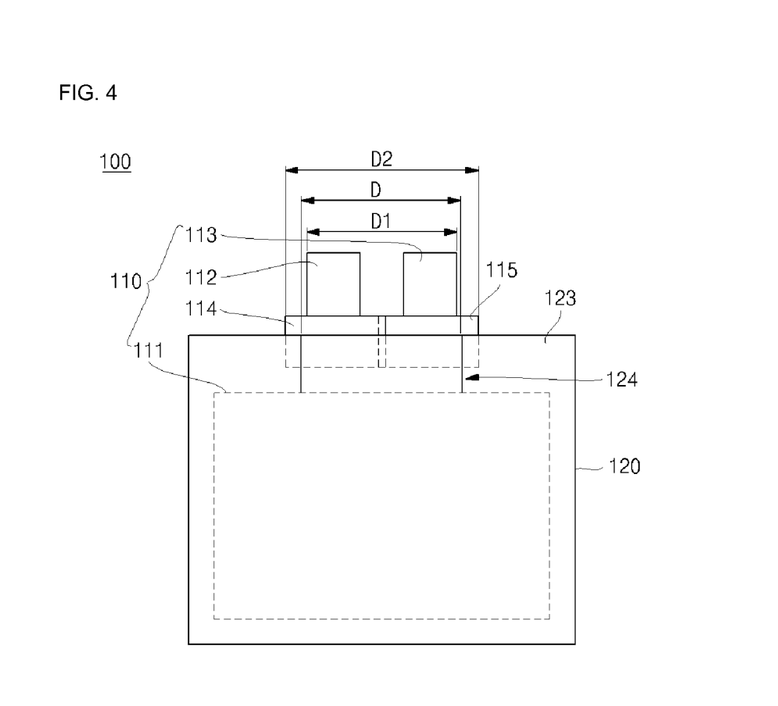
FIG. 4 is a plan view of FIG. 2.

FIGS. 1 to 4 show a pouch type lithium secondary battery according to an exemplary embodiment of the present invention. FIG. 1 is an exploded perspective view illustrating a state before a pouch case is sealed in a pouch type lithium secondary battery. FIG. 2 is a perspective view illustrating a state after the pouch case is sealed. FIG. 3 is a front view of FIG. 2. FIG. 4 is a plan view of FIG. 2.

Referring to FIG. 1, the pouch type lithium secondary battery 100 includes an electrode assembly 110 and a case 120 in which the electrode assembly 110 is sealed and housed. The electrode assembly 110 includes a battery unit 111, a cathode tab 112 and an anode tab 113 respectively connected to two electrodes of the battery unit 111.

The battery unit 111 includes a cathode plate 116, an anode plate 117, and a separator 118 disposed between the cathode plate 116 and the anode plate 117. The battery unit 111 is assembled by interposing the separator 118 between the cathode plate 116 and the anode plate 117 and winding the cathode plate 116, the anode plate 117, and the separator 118 together. The cathode plate 116 of the battery unit 111 is connected to the cathode tab 112, and the anode plate 117 is connected to the anode tab 113. The cathode tab 112 and the anode tab 113 are respectively connected to external terminals (not shown). Protection tapes 114 and 115 are wound on the cathode tab 112 and the anode tab 113 respectively so as to insulate the cathode tab 112 and the anode tab 113 from the case 120.

The case 120 includes a lower case 122 which houses the battery unit 111, and an upper case 121 which seals an upper surface of the lower case 122. A sealing part 123 is formed on three edges about the periphery of the upper and lower cases 121 and 122 at which a seal is formed.

FIGS. 2 to 4 show the pouch type lithium secondary battery 100 in which the electrode assembly 110 is housed inside the case 120 and the case 120 is closed. Referring to FIGS. 2 to 4, in the pouch type lithium secondary battery, a stepped part 124 is formed corresponding to a portion at which the cathode tab 112 and the anode tab 113 extend through the sealing part 123 from the inside of the case 120 to the outside of the case 120 between the upper case 121 and the lower case 122 of the case 120. The stepped part 124 is formed in the sealing part 123 of the upper case 121 and the lower case 122 corresponding to the portion of the sealing part 123 through which both the cathode tab 112 and the anode tab 113 extend. Although the stepped part 124 is shown as being oppositely formed in a central edge of the three edges about the periphery of the upper and lower cases 121 and 122 in which the seal is formed, the stepped part 124 is not limited thereto such the stepped part 124 may be formed in anyone of the three edges about the periphery of the upper and lower cases 121 and 122. Further, there need not be only three edges in which the seal is formed such that all of the periphery may be sealed in such a fashion.

In the pouch type lithium secondary battery 100, the battery unit 111 is housed inside the lower case 122, and the cathode tab 112 and the anode tab 113 are withdrawn outside the lower case 122. Thus, the upper case 121 seals the lower case 122. The cathode tab 112 and the anode tab 113 are wound with the protection tapes 114 and 115 at portions of the cathode tab 112 and the anode tab 113 which contact the upper and lower cases 121 and 122 and are sealed at the sealing part 123.

In the sealing part 123 of the case 120 as described above, the stepped part 124 is formed at the portion where the cathode tab 112 and the anode tab 113 are withdrawn. The cathode tab 112 and the anode tab 113 are located together at the stepped part 124. The stepped part 124 is formed by pressing the withdrawn portion of the cathode tab 112 and the anode tab 113 in the sealing part 123 by upper and lower jigs after the sealing part 123 of the upper and lower cases 121 and 122 is sealed.

The stepped part 124, where the cathode and anode tabs 112 and 113 are located together, reduces concentration of pressure on regions corresponding to the cathode tab 112 and anode tab 113, thereby reducing the danger of an electrical short between an externally exposed metal layer of the case 120 and the cathode tab 112 and the anode tab 113. In addition, a sealing pressure may be increased on the region of the sealing part 123 except for the stepped part 124, thereby improving sealing safety of the sealing part 123.

With specific reference to FIG. 4, width D of the stepped part 124 formed on the sealing part 123 is wider than a distance D1 between the outer edges of the cathode tab 112 and the anode tab 113, thereby preventing an electrical short between the cathode and anode tabs 112 and 113 at the time of forming the stepped part 124.

The width D of the stepped part 124 is formed so as to be narrower than a distance D2 between outer edges of the protection tapes 114 and 115, thereby allowing an error tolerance with regard to the setting position where the cathode and anode tabs 112 and 113 and the protection tapes 114 and 115 are withdrawn from the sealing part 123 and preventing sealing defects.

Referring to FIGS. 2 to 4, in the pouch type lithium secondary battery 100, the cathode tab 112 is wound with the protection tape 114, and the anode tab 113 is wound with the protection tape 115. That is, the cathode and anode tabs 112 and 113 are withdrawn through the sealing part 123 and wound with the protection tapes 114 and 115, and the cathode and anode tabs 112 and 113 are located in the region of the stepped part 124 together.

With specific reference to FIGS. 3 and 4, inside edges of the protection tapes 114 and 115 contact and overlap each other in the stepped part 124. The internal region of the stepped part 124, i.e., the region of the stepped part 124 between the cathode tab 112 and the anode tab 113, is sealed by the overlapping protection tapes 114 and 115.

The protection tapes 114 and 115 may be wound on the cathode and anode tabs 112 and 113 located in the stepped part 124 in various configurations. FIGS. 5 to 8 show various modification examples of the type of the protection tape wound on the two electrode tabs.

Figure 5:
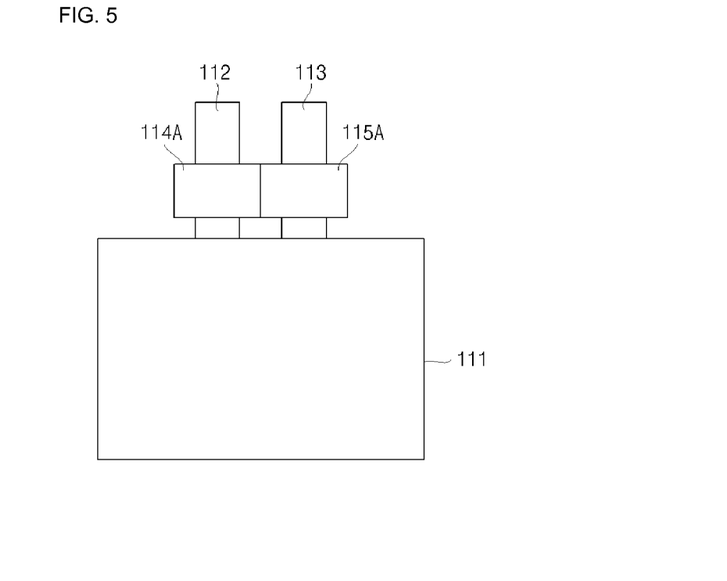
FIG. 5 is a view illustrating a state in which side edges of the protection tape wound on the electrode tab are contacted with each other.
Figure 6:
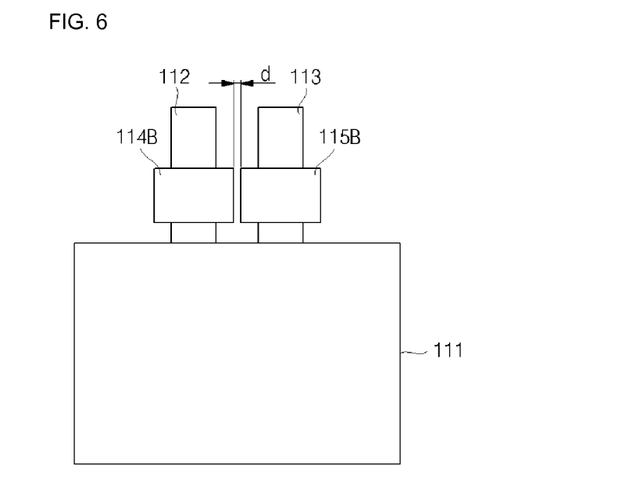
FIG. 6 is a view illustrating a state in which side edges of the protection tape wound on the electrode tab are spaced from each other.
Figure 7:
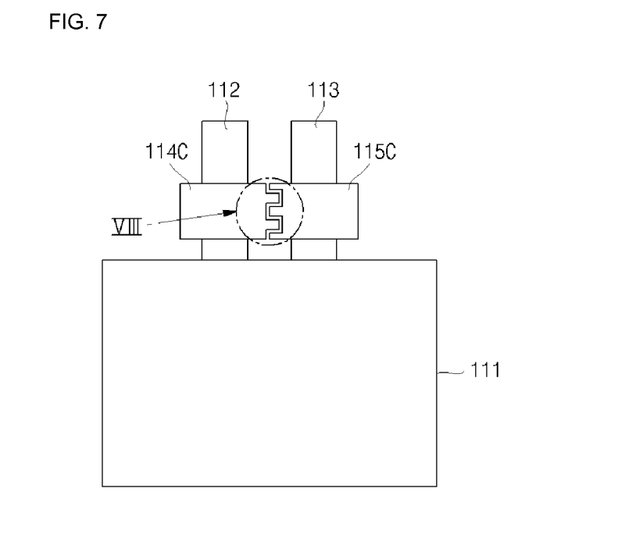
FIG. 7 is a view illustrating a state in which side edges of the protection tape wound on the electrode tabs are engaged with each other.
Figure 8:
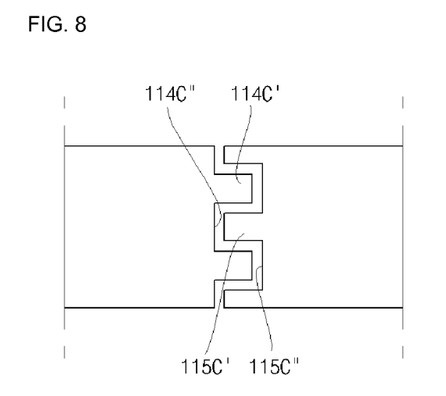
FIG. 8 is a magnification view of 'VIII' portion of FIG. 7.

FIG. 5 is a view illustrating a state in which inside edges of protection tapes 114A and 115A wound on the cathode tab 112 and the anode 113 tab contact each other. FIG. 6 is a view illustrating a state in which inside edges of protection tapes 114B and 115B wound on the cathode tab 112 and the anode 113 tab are spaced apart from each other by a distance d. FIG. 7 is a view illustrating a state in which inside edges of protection tapes 114C and 115C wound on the cathode tab 112 and the anode 113 tab are engaged with each other. FIG. 8 is a magnification view of 'VIII' portion of FIG. 7.

Referring to FIG. 5, the protection tape 114A and the protection tape 115A surround the cathode tab 112 and the anode tab 113 respectively with their adjacent side edges contacting each other. The two adjacent side edges, i.e., the inside edges, contact each other in the state that the protection tapes are wound on the electrode tabs. Or, the adjacent side edges may be partially overlapped as described above with reference to FIGS. 3 and 4. When the stepped part 124 is formed on the sealing part 123 in the state in which the protection tape 114A and protection tape 115A contact each other or are partially overlapped, the protection tapes 114A and 115A seal the internal region of the stepped part 124.

Referring to FIG. 6 illustrating another modification example, the protection tapes 114B and 115B surround the cathode tab 112 and the anode tab 113 respectively with their adjacent side edges being spaced with the distance d. The distance d is formed as a very fine gap because of the small width between the cathode and anode tabs 112 and 113. Also, in the state that the protection tapes 114B and 115B are provided with the distance d therebetween, the stepped part 124 is formed at the sealing portion 123 and thus, the protection tapes 114B and 115B seal the internal region of the stepped part 124.

Referring to FIGS. 7 and 8 illustrating still another modification example, a projection part 114C' of the protection tape 114C and a projection part 115C' of the protection tape 115C are formed so as to interlock between the protection tape 114C of the cathode tab 112 and protection tape 115C of the anode tab 113. That is, the projection part 114C' and a groove part 114C'' are alternatively formed at an inside edge of the protection tape 114C of the cathode tab 112, and the projection part 115C' and a groove part 115C'' are alternatively formed at an inside edge of the protection tape 115C of the anode tab 113. Further, the projection part 114C' is inserted into the groove part 115'', and the projection part 115C' is inserted into the groove part 114C''. Thus, two facing side edges of the protection tapes 114C and 115C are engaged with each other in an interlocking shape.

A narrow and long path is formed in the region between adjacent side edges of the protection tape 114C of the cathode tab 112 and protection tape 115C of the anode tab 113 by the combination structure of the interlocking shape. Thus, when sealing process is performed, the sealing is completed even if only a part of the narrow and long path between the protection tapes 114C and 115C includes the interlocking shape.

Figure 9:
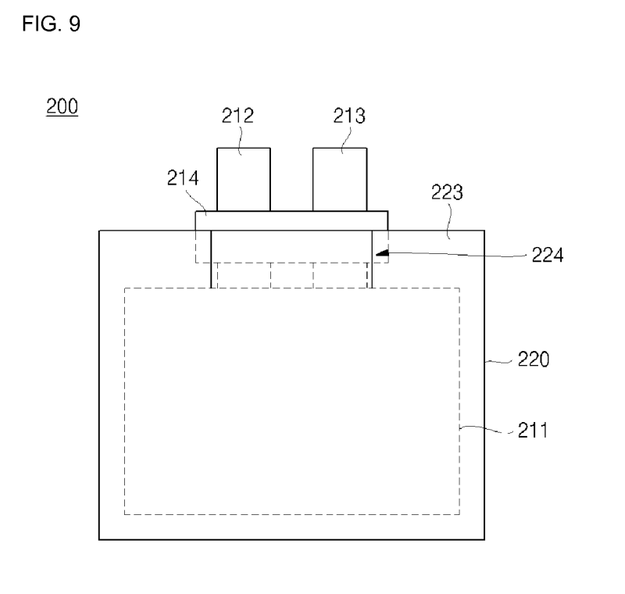
FIG. 9 is a plan view illustrating a pouch type lithium secondary battery according to an exemplary embodiment of the present invention.

FIG. 9 is a plan view illustrating a pouch type lithium secondary battery 200 according to an exemplary embodiment of the present invention. The pouch type lithium secondary battery 200 is constructed so as to surround a cathode tab 212 and an anode tab 213 with one protection tape 214. When the cathode and anode tabs 212 and 213 are surrounded by the one protection tape 214, a gap between the cathode and anode tabs 212 and 213 is constantly kept. In addition, it is possible to easily set the two electrode tabs 212 and 213 at a sealing portion 223 of a case 220. Further, sealing stability is improved in an internal region of a stepped part 224 formed at the sealing portion 223 of the case 220.

Figure 10:
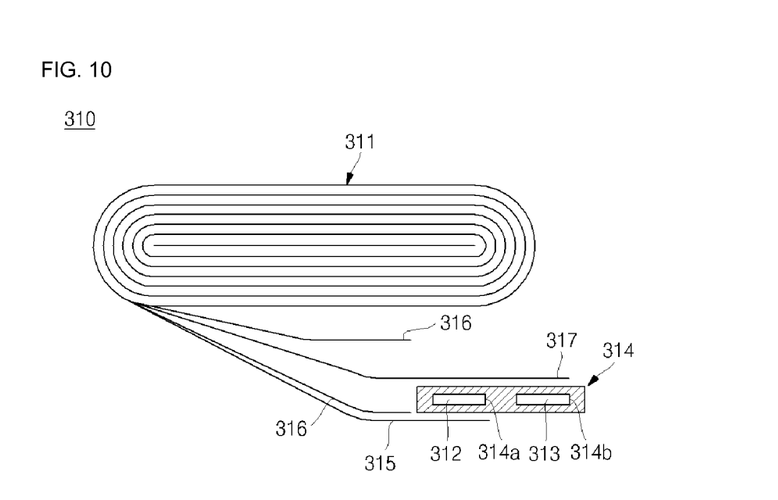
FIG. 10 is a view illustrating a state in which an electrode tab is attached to an electrode assembly.
Figure 11:
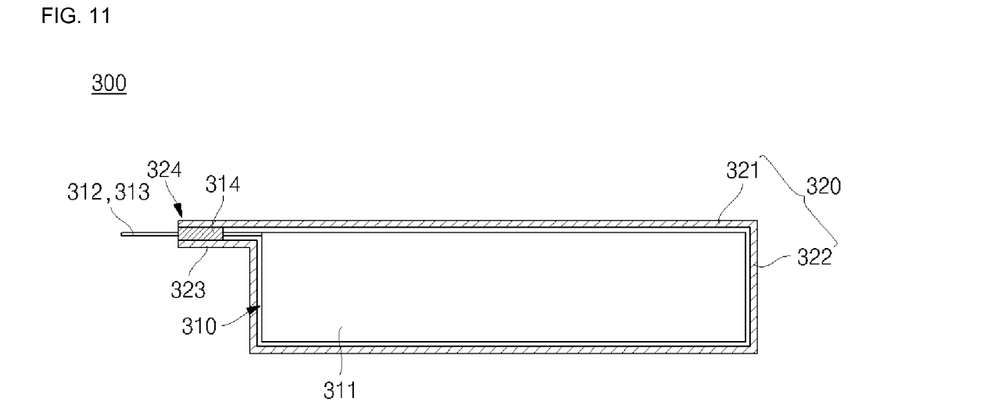
FIG. 11 is a sectional view illustrating a state in which the electrode assembly is housed in a pouch case and sealed.

FIGS. 10 and 11 show other examples related to an example embodiment of the present invention.

FIG. 10 is a view illustrating a state in which an electrode tab is attached to a battery unit according to an example embodiment of the present invention. FIG. 11 is a sectional view illustrating a pouch battery in which the electrode assembly assembled in FIG. 10 is housed in a pouch case and sealed.

As shown in FIGS. 10 and 11, a pouch type lithium secondary battery 300 is formed by disposing cathode and anode tabs 312 and 313 with one combining member 314 in advance. The combining member 314 includes tab holes 314a and 314b passing through the rectangular body of the combining member 314. The cathode and anode tabs 312 and 313 respectively extend through the tab holes 314a and 314b. The combining member 314 may be made of an insulating material.

An assembling process of the pouch type lithium secondary battery 300 will be explained below. First, a separator 316 is interposed between a cathode plate 315 and an anode plate 317 and then a battery unit 311 is wound. After winding of the battery unit 311 is finished, the cathode tab 312 is attached to an uncoated part of the cathode plate 315, where an electrode active material is not formed on the cathode plate 315. The anode tab 313 is attached to an uncoated part of the anode plate 316 on which an electrode active material is not formed. Because the cathode and anode tabs 312 and 313 are disposed in the combining member 314 in advance, a gap between the cathode and anode tabs 312 and 313 is constantly kept. Thus, disruption of the gap between the cathode and anode tabs 312 and 313 does not occur.

An electrode assembly 310 with the cathode and anode tabs 312 and 313 is received in a lower case 322, and an upper case 321 is sealed to the lower case 322. The combining member 314 fixing the cathode and anode tabs 312 and 313 are sealed in the sealing portion 323. One stepped part 324 is formed in the sealing portion 323, and thus, the combining member 314 is sealed in an internal region of the stepped part 324.

The cathode and anode tabs 312 and 313 of the electrode assembly 310 are withdrawn in parallel through the sealing portion 323 of the case 320 during the receiving process in the lower case 322 of the case 320. As such, the cathode and anode tabs 312 and 313 are attached to an outermost part of the battery unit 311. Accordingly, there is an advantage in that it is easy to control positions of the cathode and anode tabs 312 and 313 when the electrode assembly 310 is received in the lower case 321.

According to aspects of the present invention, workability of attaching the electrode tab to the electrode plate is improved in the short width type battery. In addition, sealing is improved at the sealing portion of the electrode tab and case in sealing of the upper and lower cases. Further, it is easy to control the position of the electrode tabs in the state in which the electrode assembly is housed in the case.

As described above, the pouch type lithium secondary battery according to aspects of the present invention produces the following and/or other effects: First, the quality of the sealing portion of the pouch case where the electrode tabs are withdrawn is stabilized, thereby improving reliability of the secondary battery. Second, workability of assembling and sealing process of the battery is improved, thereby improving efficiency of a manufacturing process.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A pouch type lithium secondary battery, comprising:
   an electrode assembly including two electrodes with different polarities and two electrode tabs respectively connected to the two electrodes;
   a case comprising a first case piece and a second case in combination to house the electrode assembly, the first case including a first surface and the second case configured to cover the first surface; and
   a sealing part interposed between the first case and the second case along the first surface, wherein the two electrode tabs extend through one stepped part formed in the sealing part, wherein the one stepped is raised above the first surface,
   wherein the width of the one stepped part is wider than the width of the outside ends of the two electrode tabs, and
   wherein the whole thickness of the stepped part is substantially uniform.

2. The pouch type lithium secondary battery of the claim 1, wherein the two electrode tabs are respectively surrounded by insulating members, and wherein the stepped part comprises two side parts and one center part between the two side parts, wherein the two side parts include the first case, the second case and the insulating member, wherein the center part includes the first case, the second case, the insulating member and the two electrode tabs, and wherein the thickness of the two side parts is larger than a thickness of the first case and the second case.

3. The pouch type lithium secondary battery of claim 2, wherein a width of the center part is smaller than a width of the outside ends of the insulating members along the sealing part.

\* \* \* \* \*